DE LLOYD O. DUNCAN.
RESERVOIR BROACH.
APPLICATION FILED MAR. 12, 1919.
1,327,149.
Patented Jan. 6, 1920.
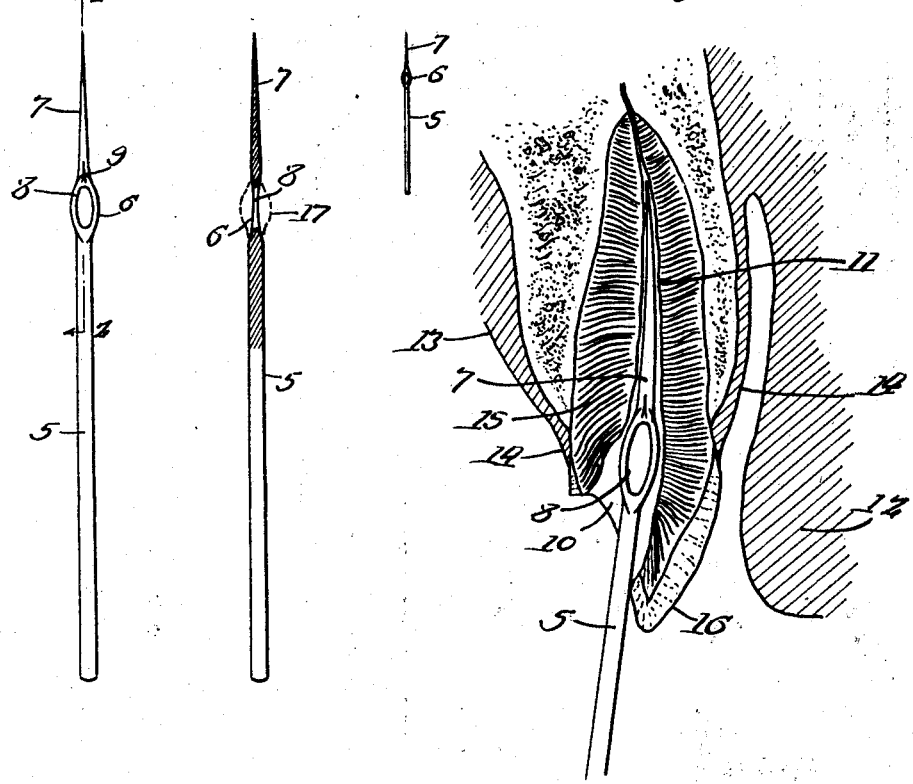

UNITED STATES PATENT OFFICE.

DE LLOYD O. DUNCAN, OF ROCKFORD, ILLINOIS.

RESERVOIR-BROACH.

1,327,149.  Specification of Letters Patent.  Patented Jan. 6, 1920.

Application filed March 12, 1919. Serial No. 282,108.

*To all whom it may concern:*

Be it known that I, DE LLOYD O. DUNCAN, a citizen of the United States, residing at Rockford, in the county of Winnebago and State of Illinois, have invented certain new and useful Improvements in Reservoir-Broaches, of which the following is a specification.

This invention relates in general to dentistry, and has more particular reference to means for introducing liquids into the root canals and interstices of teeth for the purpose of devitalizing or anesthetizing nerves so that they can be removed painlessly, and also for treating and preparing the root canals for filling and for other purposes as will be hereinafter noted.

Under the present practice, liquid medicines are often introduced into the root canals of lower teeth simply by means of a dropper, but in treating upper teeth this method is obviously impractical. It is also general practice to introduce liquids by means of a suitable broach covered with cotton or any suitable absorbent, the cotton-covered broach being first dipped in the medicine and then inserted in the root canal. This is repeated until a sufficient quantity of medicine has been introduced, and in effect, the canal has been literally flooded. Such practice, however, is unsatisfactory in many respects. It requires the use of a rubber dam as a protection for the teeth and mouth against the medicine which is extremely difficult to confine to the treating area, mainly because an excessive amount of medicine must be used and the root canal flooded before the medicine reaches the upper end thereof. As a consequence, when strong medicines or those having staining properties are used it is extremely difficult to avoid injuring or discoloring the sound and healthy portions adjoining the part of the tooth being treated. Also, some of the medicines are very expensive and only a comparatively small quantity is required if it can be properly introduced into the canal. It is manifest that regardless of the skill of the operator the foregoing method entails considerable waste of medicine compared to the amount actually needed if it could be properly applied. But probably the most objectionable and serious consequence of this method is the time required for properly treating even an ordinary case; and where pulp stones are encountered in the canal the work extends over a considerable period and many treatments are required to clear the passage, devitalize the nerve and properly prepare the canal for filling. In considering the matter of introducing medicine to root canals it should also be borne in mind that any practice which imposes a pressure on the introduced liquid is very apt to cause serious results by forcing purulent matter out through the upper end of the root canal.

The present invention has for its main object the provision of a novel means and method of introducing liquids into the root canals of teeth by which to obviate the objections, disadvantages and serious results attendant upon and following from the methods now in vogue.

I have also aimed to provide a means which permits the introduction of liquids into root canals quickly, conveniently, economically and in a thoroughly practical and effective manner, even under extreme and difficult conditions.

In furtherance of the foregoing general objects, my invention contemplates the provision of what I have termed a "reservoir broach" characterized by the inclusion of a narrow point adapted to enter a root canal substantially to the end thereof, and a means permanently associated with the broach at the base or neck of the point for carrying a small quantity such as a drop or globule of medicine. My invention contemplates a construction such as will permit of handling and holding the broach in any position without dropping or losing the medicine. In the treatment of root canals of upper teeth, this feature is of great advantage, and the release of medicine from the reservoir is under absolute control of the operator. Furthermore, a predetermined quantity of medicine is held and the entire amount will be introduced into the root canal in such manner as to be exactly controlled and applied to the affected or desired area. This is done by running the tapered point of the broach into the root canal which is likewise of a tapered or conical shape. As a consequence the caliber of the canal is in effect reduced considerably throughout substantially its entire length. The broach is now brought to a position, or is so manipulated that the drop of medicine comes into contact with the inner wall of the canal at the mouth thereof. The capillary attraction of the liquid in its contact with the canal will be greater than adhesion of the liquid to the broach, and the liquid will almost instantly rise as in a capillary tube to the very point of the broach and beyond to the end or apex of the root canal. It will be seen that the point of the broach has the effect of reducing the caliber of the root canal, leaving as it were, a very narrow peripheral capillary channel about the slender point, but also serves as a guide for leading the liquid into the canal with increasing facility as the canal diminishes in caliber at its upper end. It will thus be plainly seen that I have provided a very simple and novel means and method of introducing liquids into root canals and the like in an exceptionally advantageous manner as will be appreciated by those familiar with this profession.

Referring to the accompanying drawings,—

Figure 1 is an enlarged view of a broach embodying one form of my improvements;

Fig. 2, a view of the broach, partly in section, as on the section line 2—2 of Fig. 1;

Fig. 3, an illustration of the broach shown in Fig. 1, actual size; and

Fig. 4, an enlarged diagrammatic view illustrating the use of my improvements.

My invention in the preferred form is exemplified in connection with a broach which may be either permanently or detachably fitted to a holder or handle, as will be well understood in this art. The broach illustrated in this case consists, generally stated, of a shank 5, reservoir 6 and point 7. My invention contemplates the construction of these portions, viz: the shank, reservoir and point, in any suitable size, shape and proportions for the purposes in mind. That is, the broaches are supplied in different sizes and styles to suit the various requirements of the profession. For example, the points will be of different lengths and diameters and might be straight, curved or angular with respect to the shank. Also the reservoir portions of different broaches will be shaped if desired, to hold different quantities of medicine, so that an operator may select the particular broach best suited to the conditions and work at hand.

Referring now to the drawing, it will be noted that the point 7 is of substantial length and tapered to a fine point. The reservoir portion 6 is formed in the present instance by flattening the body of the portion at the base or neck of the point and perforating this body portion as at 8. The present perforation is elongated lengthwise of the broach, and one or more lead grooves 9 may be formed in the body communicating the aperture 8 with the point 7. The lead grooves are not of sufficient size to cause loss of the globule of medicine while handling the broach, but will facilitate considerably passage of the medicine into the root canal, as will be presently seen. It should be here noted that my invention contemplates forming the aperture 8 in any suitable shape or size, and also as mentioned above, the provision in combination with the point 7 of a reservoir portion of suitable construction for holding a small quantity of medicine in coöperative relation with the point.

In illustrating the use of my improvements, I have shown in Fig. 4 the interior construction and contents of a cuspid (canine) tooth having a cavity 10 approaching the central part of the tooth and leading into the root canal 11. As explanatory of this drawing, 12 indicates the upper lip, 13 the roof of the mouth, 14 the gum, 15 dentine (inner bone-like substance) and 16 enamel. In this view, the broach is shown with the point extended its full length into the root canal, whereby the reservoir is brought into close proximity to the walls of the canal so that upon a very slight movement the globule of medicine will touch the canal wall and follow the narrowest passage, which obviously leads upwardly into the canal. It will be noted that the body of the point 7 which is somewhat flexible, constitutes what might be termed a capillary guide as it serves in effect to reduce the caliber of the canal and permits the liquid to rise to the very apex of the root by capillary action. Thus no medicine is wasted as it is applied in a most direct manner to the surfaces and parts being treated. The lead grooves 9 while not essential, facilitate this movement of the liquid into the root canal. As already mentioned, the point 7 may be made in different lengths and diameters and different degrees of flexibility so as to conform most effectually to the conditions at hand; also the reservoir may be so constructed as to carry a desired quantity of liquid in coöperative relation to the point so that at the proper moment the liquid will be delivered to the point and into the root canal.

To fill the reservoir of the broach I have found it convenient and practical to place a drop of medicine on a glass slab or the equivalent, pass the broach (which has been sterilized) into the medicine until the aperture or reservoir portion is completely submerged, and in a horizontal position, and then raise the broach vertically with a quick motion, thus taking the maximum amount of medicine the reservoir will hold. The medicine obviously will be held both by adhesion to the body portion of the reservoir and by cohesion, the shape of a globule of medicine thus obtained being indicated by the character 17, Fig. 2. A smaller amount of medicine is taken into the reservoir if the broach is raised slowly. It should be noted that before the broach is used it will be properly sterilized, and thus permits medicine to be used in a strictly aseptical manner, as no cotton or other absorbent material is used with the broach. In practice, it will be found that capillary action in the root canal is facilitated if the point of the broach is passed through the medicine prior to immersing the reservoir portion therein.

While the practical advantages and desideratum of my improvements should be readily appreciated by the dental profession, I wish to emphasize its use as a most efficient and effective means for practising silver nitrate and other metallic impregnation treatments. In these cases special care must be exercised to confine the silver nitrate or other metallic solution to the root canal and tissues being treated, because a dark discoloration will be produced by precipitation of the silver or other material used. By the use of my reservoir broach the disadvantages attendant upon the present practice of these treatments are obviated, and a definite amount of the solution may be easily and quickly applied to the desired area and to the very end of a root canal, as fully described above. Since treatments of this kind are well known to the profession, I do not deem it necessary to give a detailed description thereof, for it will be readily understood that my improved reservoir broach is simply used as the medium for applying and introducing solutions.

It is believed that the foregoing conveys a clear understanding of the principles of my invention and of the objects prefaced above, that my improved reservoir broach may be very effectively used in introducing liquid medicines of various kinds into the root canals and interstices of teeth for devitalizing and anesthetizing the nerves so that they can be removed painlessly, that the broach is also especially useful in conveying medicine through the ends of the roots of the teeth in the treatment of apical abscesses and in placing medicines into the roots for the removal of pulp stones.

It should be understood that while I have illustrated and described but a single practical embodiment of my improvements various changes might be made in size, shape and proportion of the parts without departing from the spirit and scope of the invention as expressed in the appended claims, in which—

I claim:

1. An instrument for introducing liquid into a relatively small canal comprising a body shaped to form a shank having a slender point adapted to be inserted a substantial distance into the canal, the body being formed intermediate the shank and point portions with an open reservoir adapted to hold a quantity of liquid in coöperative relation to the point.

2. The method of introducing liquids into root canals and the like which consists in holding a drop or globule of liquid in coöperative relation to a slender elongated point adapted for introduction into a root canal, inserting said point into the canal, and moving the point to such a position in the canal that the liquid will contact the wall thereof and will flow into the canal by capillary attraction, guided by the point.

3. A dental broach of the character described comprising a shank terminating at one end in a comparatively slender point and shaped at the base thereof to provide means for retaining a globule of liquid in coöperative relation to the periphery of the point, whereby the latter when inserted into a small canal has the effect of reducing the caliber thereof and constitutes a peripheral capillary guide for inducing movement of liquid into the canal.

DE LLOYD O. DUNCAN.